US011048264B2

(12) United States Patent
Li et al.

(10) Patent No.: US 11,048,264 B2
(45) Date of Patent: Jun. 29, 2021

(54) SYSTEMS AND METHODS FOR POSITIONING VEHICLES UNDER POOR LIGHTING CONDITIONS

(71) Applicant: BEIJING DIDI INFINITY TECHNOLOGY AND DEVELOPMENT CO., LTD., Beijing (CN)

(72) Inventors: Baoli Li, Beijing (CN); Zugang Chen, Beijing (CN); Lu Feng, Beijing (CN); Ye Wang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 73 days.

(21) Appl. No.: 16/232,128

(22) Filed: Dec. 26, 2018

(65) Prior Publication Data

US 2020/0159239 A1    May 21, 2020

Related U.S. Application Data

(63) Continuation of application No. PCT/CN2018/115886, filed on Nov. 16, 2018.

(51) Int. Cl.
*G05D 1/02*      (2020.01)
*G06K 9/00*      (2006.01)
(Continued)

(52) U.S. Cl.
CPC ......... *G05D 1/0231* (2013.01); *G05D 1/0088* (2013.01); *G06K 9/00791* (2013.01);
(Continued)

(58) Field of Classification Search
CPC ............... G05D 1/0231; G05D 1/0088; G05D 2201/0213; G06K 9/00791; G06K 9/6202;
(Continued)

(56) References Cited

U.S. PATENT DOCUMENTS

| 2016/0042551 A1 | 2/2016 | Imber et al. |
| 2017/0148168 A1 | 5/2017 | Lindner et al. |

(Continued)

FOREIGN PATENT DOCUMENTS

| CN | 101329773 A | 12/2008 |
| CN | 103617647 A | 3/2014 |

(Continued)

OTHER PUBLICATIONS

Office Action in Canadian Application No. 3028223 dated Nov. 14, 2019, 6 pages.

(Continued)

*Primary Examiner* — Khoi H Tran
*Assistant Examiner* — Rodney P King
(74) *Attorney, Agent, or Firm* — Bayes PLLC

(57) ABSTRACT

Embodiments of the disclosure provide methods and systems for positioning a vehicle. The system may include a communication interface configured to receive a set of point cloud data with respect to a scene captured under a first lighting condition by at least one sensor. The system may further include a storage configured to store the set of point cloud data, and a processor. The processor may be configured to identify at least one local light source based on the set of point cloud data, modify the set of point cloud data based on a simulated light from the at least one local light source corresponding to a second lighting condition, and position the vehicle under the second lighting condition based on the modified set of point cloud data.

20 Claims, 11 Drawing Sheets

(51) Int. Cl.
*G06K 9/62* (2006.01)
*G06T 7/73* (2017.01)
*G06T 7/521* (2017.01)
*G05D 1/00* (2006.01)

(52) U.S. Cl.
CPC ............ *G06K 9/6202* (2013.01); *G06T 7/521* (2017.01); *G06T 7/74* (2017.01); *G05D 2201/0213* (2013.01); *G06T 2207/10028* (2013.01); *G06T 2207/30252* (2013.01)

(58) Field of Classification Search
CPC .. G06T 7/74; G06T 2207/10028; G06T 7/521
USPC .......................................................... 701/28
See application file for complete search history.

(56) References Cited

U.S. PATENT DOCUMENTS

| | | | |
|---|---|---|---|
| 2017/0176641 A1* | 6/2017 | Zhu | G05D 1/0088 |
| 2017/0178332 A1 | 6/2017 | Lindner et al. | |
| 2017/0227647 A1 | 8/2017 | Baik | |
| 2018/0004225 A1 | 1/2018 | Milstein et al. | |
| 2018/0047147 A1 | 2/2018 | Viswanathan | |
| 2018/0088234 A1 | 3/2018 | Scherer et al. | |
| 2018/0284780 A1* | 10/2018 | McWhirter | G01S 7/4861 |
| 2019/0065637 A1* | 2/2019 | Bogdoll | G06N 20/00 |
| 2019/0220650 A1 | 7/2019 | Lindner et al. | |
| 2019/0311487 A1* | 10/2019 | Xiao | G06T 7/521 |
| 2020/0134833 A1* | 4/2020 | Biswas | G06T 7/187 |

FOREIGN PATENT DOCUMENTS

| | | |
|---|---|---|
| CN | 104268933 A | 1/2015 |
| CN | 105374065 A | 3/2016 |
| CN | 106296693 A | 1/2017 |
| CN | 207396738 U | 5/2018 |
| CN | 108475062 A | 8/2018 |
| CN | 108700876 A | 10/2018 |
| JP | 2012168098 A | 9/2012 |
| WO | 2015/036912 A1 | 3/2015 |
| WO | 2018055449 A2 | 3/2018 |

OTHER PUBLICATIONS

International Search Report in PCT/CN2018/115886 dated Aug. 22, 2019, 5 Pages.
Written Opinion in PCT/CN2018/115886 dated Aug. 22, 2019, 4 pages.
The Australian Examination Report in Australian Application No. 2018282304 dated Aug. 5, 2019, 8 pages.
Matti T. Vaaja et al., Luminance-Corrected 3D Point Clouds for Road and Street Environments, Remote Sensing, 7: 11389-11402, 2015.
Yu Yongtao et al., Semiautomated Extraction of Street Light Poles From Mobile LiDAR Point-Clouds, IEEE Transactions on Geoscience and Remote Sensing, 53(3): 1374-1386, 2015.
Supreeth Achar, Active Illumination for the Real World, 2017.
Yukyung Choi et al., KAIST Multi-Spectral Day/Night Data Set for Autonomous and Assisted Driving, IEEE Tansactions on Intelligent Transportation Systems, 19(3): 934-948, 2018.
Extended European Search Report issued in corresponding European Application No. 18 814 762.3, dated Feb. 11, 2021, 9 pages.
Notice of Reasons for Rejection issued in corresponding Japanese Application No. 2018-566536, dated Feb. 16, 2021, 5 pages.
First Examination Report issued in corresponding India Application No. 201817048278, dated Mar. 4, 2021, 7 pages.
First Office action issued in corresponding Chinese Application No. 201880002638.5, dated Mar. 24, 2021, 8 pages.

\* cited by examiner

SYSTEMS AND METHODS FOR POSITIONING VEHICLES UNDER POOR LIGHTING CONDITIONS

CROSS-REFERENCE TO RELATED APPLICATIONS

This application is a Continuation of International Application No. PCT/CN2018/115886, filed on Nov. 16, 2018, the entire contents of which are hereby incorporated by reference.

TECHNICAL FIELD

The present disclosure relates to systems and methods for positioning vehicles under poor lighting conditions, and more particularly to, systems and methods for positioning vehicles under poor lighting conditions using a dark scene simulated from a reconstructed scene modified with shading calculated from local light sources.

BACKGROUND

Autonomous driving has become an increasingly popular technology over the years. A vehicle capable of self-driving without human input frees up its driver, who can instead focus on other matters while sitting inside. Like a human being driver, an autonomous driving vehicle needs to know where it is in a given environment, so that it can determine which direction it should head to, and also be prepared to avoid surrounding dangers, such as unsafe road conditions as well as approaching objects like a human being or another vehicle. Therefore, the reduced driver attention to the vehicle has to be compensated by advanced technology in order to maintain at least the same level of safety for autonomous driving as compared to driving by a human being.

One of such advanced technologies is computer vision. The computer vision technology acquires, processes, analyzes, and understands digital images in order to position the vehicle in the context of autonomous driving. A self-driving vehicle is often equipped with various sensors, detectors, and other devices to obtain information around it. Examples of such sensors and devices include 3-D cameras, LiDAR scanners, global positioning system (GPS) receivers, and inertial measurement unit (IMU) sensors. They capture features of the surrounding objects and the road on which the vehicle is traveling. The features captured may include, for example, center line or border line coordinates of a lane, coordinates and images of an object, such as a building, another vehicle, a landmark, a pedestrian, or a traffic sign. After converting these features into digital data and by integrating such data into calculation of its spatial position, the autonomous driving vehicle is able to "know" where it is on the road as if the driver were behind the wheel.

The existing image-based positioning methods require environments with sufficient luminance and visibility, such as during the daytime. For vehicles driving under poor lighting conditions, such as during the nighttime, these algorithms fail to show satisfactory performance results. This is partly because the visual appearance of the same scene varies significantly between daytime and nighttime. Natural illumination disappears after sunset, and the darkness causes the scene to be less recognizable by imaging sensors and detectors. Moreover, the addition of local lights with fixed positions, such as billboards and streetlights, introduces unnatural light components that further complicates the calculation of the vehicle's spatial positioning and the location of other objects. These may cause more noise and color distortion in the images obtained by sensors and detectors and, as a result, decrease the positioning reliability by the autonomous driving system. This ultimately compromises the safety of the vehicle implementing such an autonomous driving system.

Consequently, to address the above problems, there is a need for systems and methods for positioning a vehicle under poor lighting conditions, such as those described herein.

SUMMARY

Embodiments of the disclosure provide a system for positioning a vehicle. The system may include a communication interface configured to receive a set of point cloud data with respect to a scene captured under a first lighting condition by at least one sensor. The system may further include a storage configured to store the set of point cloud data, and a processor. The processor may be configured to identify at least one local light source based on the set of point cloud data, modify the set of point cloud data based on a simulated light from the at least one local light source corresponding to a second lighting condition, and position the vehicle under the second lighting condition based on the modified set of point cloud data.

Embodiments of the disclosure also provide a method for positioning a vehicle. The method may include receiving a set of point cloud data with respect to a scene captured under a first lighting condition by at least one sensor. The method may further include identifying at least one local light source based on the set of point cloud data, modifying the set of point cloud data based on a simulated light from the at least one local light source corresponding to a second lighting condition, and positioning the vehicle under the second lighting condition based on the modified set of point cloud data.

Embodiments of the disclosure further provide a non-transitory computer-readable medium having instructions stored thereon that, when executed by one or more processors, causes the one or more processors to perform operations. The operations may include receiving a set of point cloud data with respect to a scene captured under a first lighting condition by at least one sensor. The operations may further include identifying at least one local light source based on the set of point cloud data, modifying the set of point cloud data based on a simulated light from the at least one local light source corresponding to a second lighting condition, and positioning the vehicle under the second lighting condition based on the modified set of point cloud data.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
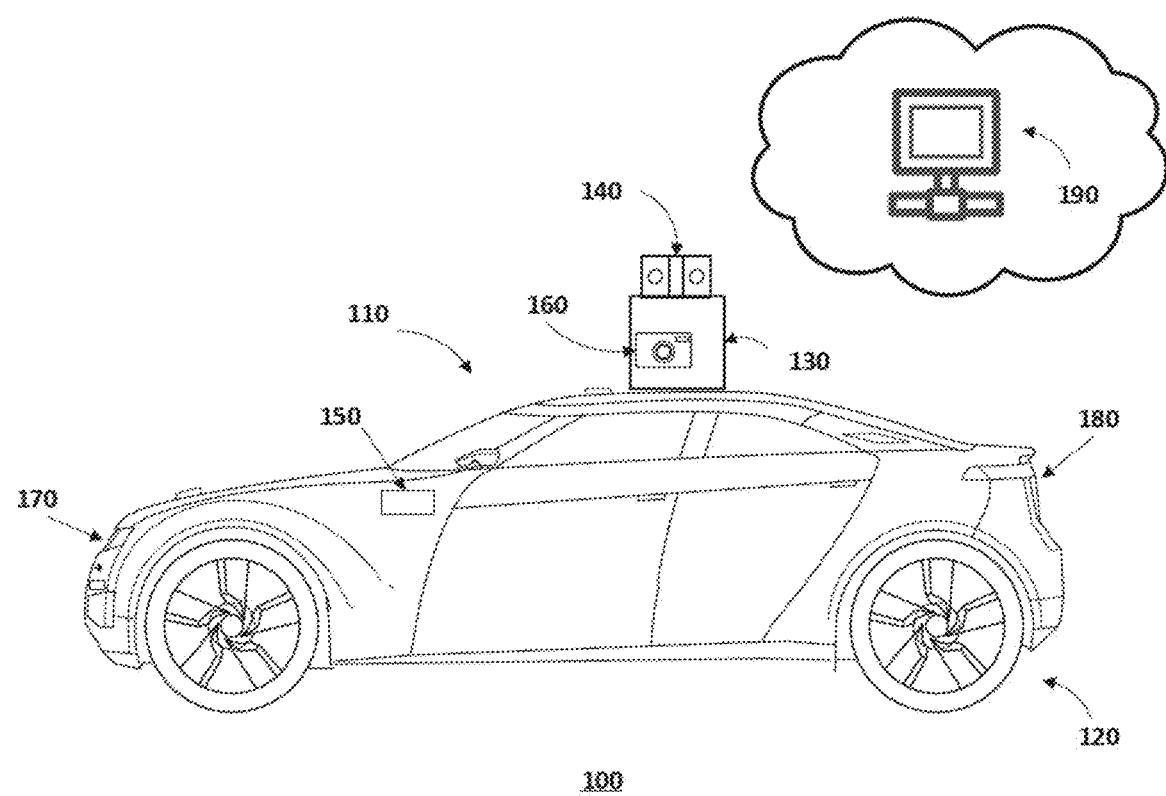
FIG. 1 illustrates a schematic diagram of an exemplary vehicle equipped with sensors, according to embodiments of the disclosure.

FIG. 1 illustrates a schematic diagram of an exemplary vehicle 100 having a plurality of sensors 140, 150 and 160 in the system according to embodiments of the disclosure. Consistent with some embodiments, vehicle 100 may be a survey vehicle configured for acquiring data for constructing a high-definition map or three-dimensional (3-D) city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a toy car, a motorcycle, a sports vehicle, a coupe, a convertible, a sedan, a pick-up truck, a station wagon, a sports utility vehicle (SUV), a minivan, a conversion van, a multi-purpose vehicle (MPV), or a semi-trailer truck. In some embodiments, vehicle 100 may include a pair of front wheels and a pair of rear wheels, as illustrated in FIG. 1. However, it is contemplated that vehicle 100 may have less or more wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with various sensors 140 and 160 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. In other embodiments, sensors 140 and 160 may be installed on the surface of body 110 of vehicle 100, or embedded inside vehicle 100, as long as the intended functions of these sensors are carried out.

Consistent with some embodiments, sensors 140 and 160 may be configured to capture data as vehicle 100 travels along a trajectory. For example, sensor 140 may be a LiDAR scanner configured to scan the surrounding and acquire point clouds. LiDAR measures distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. Because a narrow laser beam can map physical features with very high resolution, a LiDAR scanner is particularly suitable for high-definition map surveys. In some embodiments, a LiDAR scanner may capture a point cloud. As vehicle 100 travels along the trajectory, sensor 140 may continuously capture data. Each set of scene data captured at a certain time stamp is known as a data frame.

As illustrated in FIG. 1, vehicle 100 may be additionally equipped with sensor 150, which may be sensors used in a navigation unit, such as a GPS receiver and one or more IMU sensors. Sensor 150 can be embedded inside, installed on the surface of, or mounted outside of body 110 of vehicle 100, as long as the intended functions of sensor 150 are carried out. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 150 can provide real-time pose information of vehicle 100 as it travels, including the positions and orientations (e.g., Euler angles) of vehicle 100 at each time stamp.

Consistent with the present disclosure, vehicle 100 may be additionally equipped with sensor 160 configured to capture digital images, such as one or more cameras. In some embodiments, sensor 160 may include a panoramic camera with 360-degree FOV, a camera with FOV less than 360 degrees, or a binocular camera that captures depth information. As vehicle 100 moves along a trajectory, digital images with respect to a scene (e.g., including objects surrounding vehicle 100) can be acquired by sensor 160. Each image may include textual information of the objects in the captured scene represented by pixels. Each pixel may be the smallest single component of a digital image that is associated with color information and coordinates in the image. For example, the color information may be represented by the RGB color model, the CMYK color model, the YCbCr color model, the YUV color model, or any other suitable color model. The coordinates of each pixel may be represented by the rows and columns of the array of pixels in the image. In some embodiments, sensor 160 may include multiple monocular cameras mounted at different locations and/or in different angles on vehicle 100 and thus, have varying view positions and/or angles. As a result, the images may include front view images, side view images, top view images, and bottom view images.

Further illustrated in FIG. 1, vehicle 100 may be additionally equipped with its own light sources, such as headlamp 170 and taillamp 180. Although not illustrated herein, other types of vehicle light sources may include sidelamps, front fog lamps, cornering lamps, infrared light sources, or other types of auxiliary light sources. The vehicle light sources my use various illuminating materials, such as tungsten, tungsten-halogen, LED or laser. Headlamp 170 includes one or more lamps attached to the front of vehicle 100 and produces light beams to light the path in front of it. Modern vehicles are generally capable of emitting two different types of light beams, low beam and high beam. Low beam provides light sufficient for forward and lateral illumination while avoiding glare in the eyes of drivers coming towards the vehicle. High beam provides an intense, center-weighted distribution of light and therefore illuminates a much farther area of the road, but it does not control glare in particular. Taillamp 180 includes one or more lamps attached to the back of vehicle 100. An exemplary taillamp 180 emits lights in the darkness or when the vehicle is backing, thus alerting the drivers traveling behind vehicle 100 of its presence and movement.

Consistent with some embodiments, the present disclosure may optionally include a server 190 communicatively connected with vehicle 100. In some embodiments, server 190 may be a local physical server, a cloud server (as illustrated in FIG. 1), a virtual server, a distributed server, or any other suitable computing device. Server 190 may receive data from and transmit data to vehicle 100 via a network, such as a Wireless Local Area Network (WLAN), a Wide Area Network (WAN), wireless networks such as radio waves, a nationwide cellular network, a satellite communication network, and/or a local wireless network (e.g., Bluetooth™ or WiFi).

Figure 2:
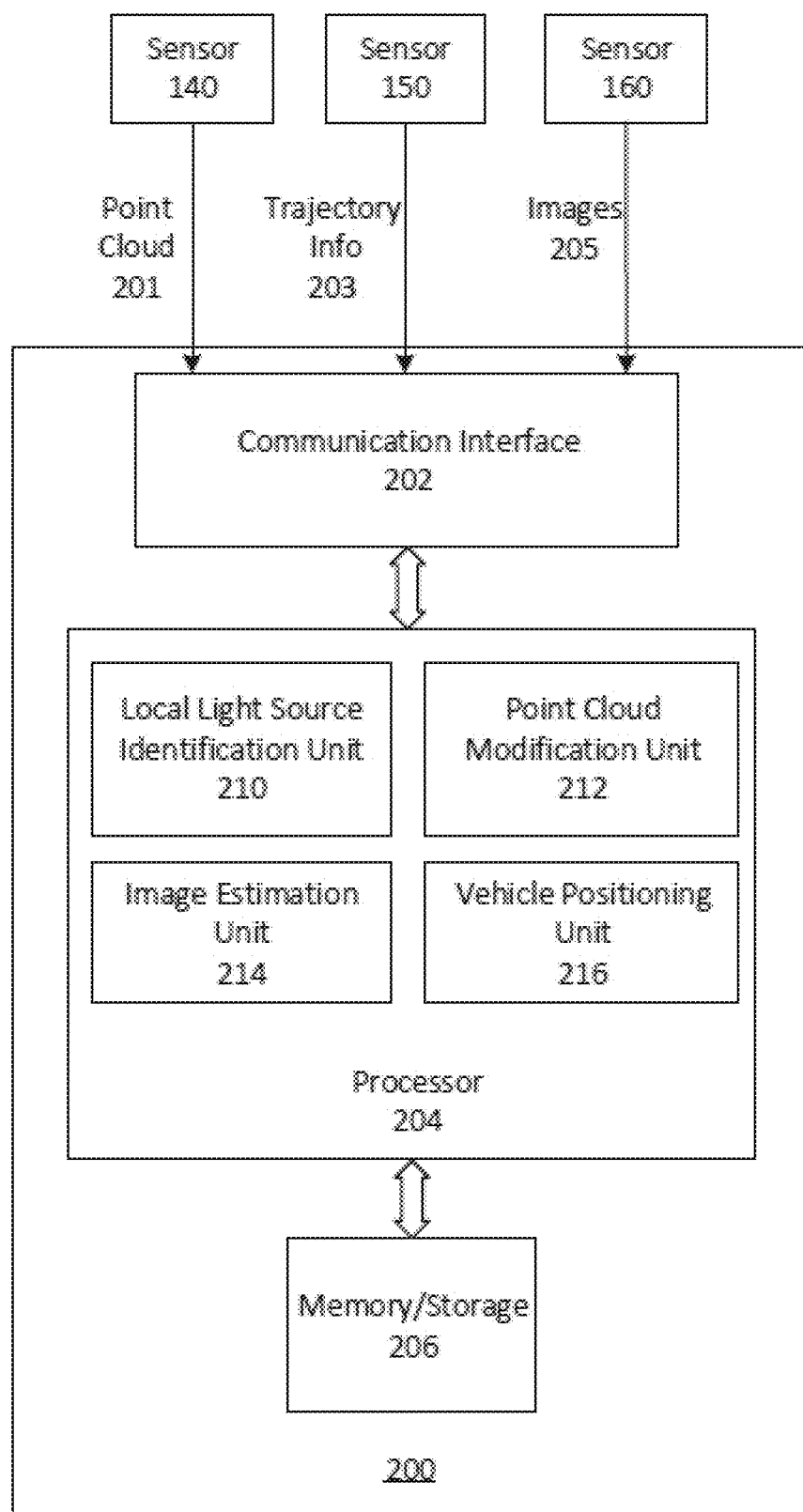
FIG. 2 illustrates a block diagram of an exemplary system for positioning a vehicle, according to embodiments of the disclosure.

The system according to the current disclosure may be configured to capture a point cloud under a first lighting condition (e.g., during daytime), to modify the point cloud by simulating a second lighting condition (e.g., during nighttime), and to position vehicle 100 under the second lighting condition using the modified point cloud. FIG. 2 illustrates a block diagram of an exemplary system 200 for positioning vehicle 100 based on the various data captured by sensors 140, 150 and 160. The data may include a point cloud 201 captured by sensor 140 (e.g., a LiDAR scanner), trajectory information 203 of vehicle 100 acquired by sensor 150 (e.g., a GPS receiver and/or one or more IMU sensors), and a plurality of images 205 captured by sensor 160 (e.g., one or more monocular cameras).

In some embodiments, as shown in FIG. 2, system 200 may include a communication interface 202, a processor 204, and a memory/storage 206. One or more components of system 200 may be located inside vehicle 100 or may be alternatively in a mobile device, in the cloud, or another remote location. Components of system 200 may be in an integrated device, or distributed at different locations but communicate with each other through a network (not shown). Communication interface 202 may send data to and receive data from components such as sensors 140, 150 and 160 via wireless or cable networks. Consistent with some embodiments, communication interface 202 may receive data captured by sensors 140, 150 and 160, including point cloud 201, trajectory information 203, and images 205, and provide the received data to memory/storage 206 for storage or to processor 204 for processing. Communication interface 202 may also receive modified point cloud generated by processor 204, and provide the modified point cloud to any local component in vehicle 100 or any remote device via a network.

Memory/storage 206 may include any appropriate type of mass storage provided to store any type of information that processor 204 may need to operate. Memory/storage 206 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory/storage 206 may be configured to store one or more computer programs that may be executed by processor 204 to perform various functions disclosed herein.

Processor 204 may include any appropriate type of general-purpose or special-purpose microprocessor, digital signal processor, or microcontroller. Processor 204 may be configured as a separate processor module dedicated to performing one or more specific functions. Alternatively, processor 204 may be configured as a shared processor module for performing other functions unrelated to the one or more specific functions. As shown in FIG. 2, processor 204 may include multiple modules, such as a local light source identification unit 210, a point cloud modification unit 212, an image estimation unit 214, a vehicle positioning unit 216, and the like. These modules (and any corresponding sub-modules or sub-units) can be hardware units (e.g., portions of an integrated circuit) of processor 204 designed for use with other components or to execute a part of a program. Although FIG. 2 shows units 210, 212, 214 and 216 all within one processor 204, it is contemplated that these units may be distributed among multiple processors located near or remotely with each other.

Local light source identification unit 210 is configured to identify local light sources, such as a street lamp, a billboard, etc., based on point cloud 201. Consistent with the present disclosure, point cloud 201 is captured under a normal lighting condition, e.g., during the daytime. In some embodiments, 3-D point cloud 201 may be converted to a voxel image of the captured scene. Using the voxel image, light sources may be segmented and identified. The local light sources may be detected when vehicle 100 is traveling along a trajectory while acquiring information with sensors 140 and 160. The local light sources are different from natural lights in that they are man-made artificial lighting equipment that provide illumination in addition to natural lights and are generally fixed at a predetermined place. A more detailed example will be explained below with reference to FIG. 3.

Figure 3:
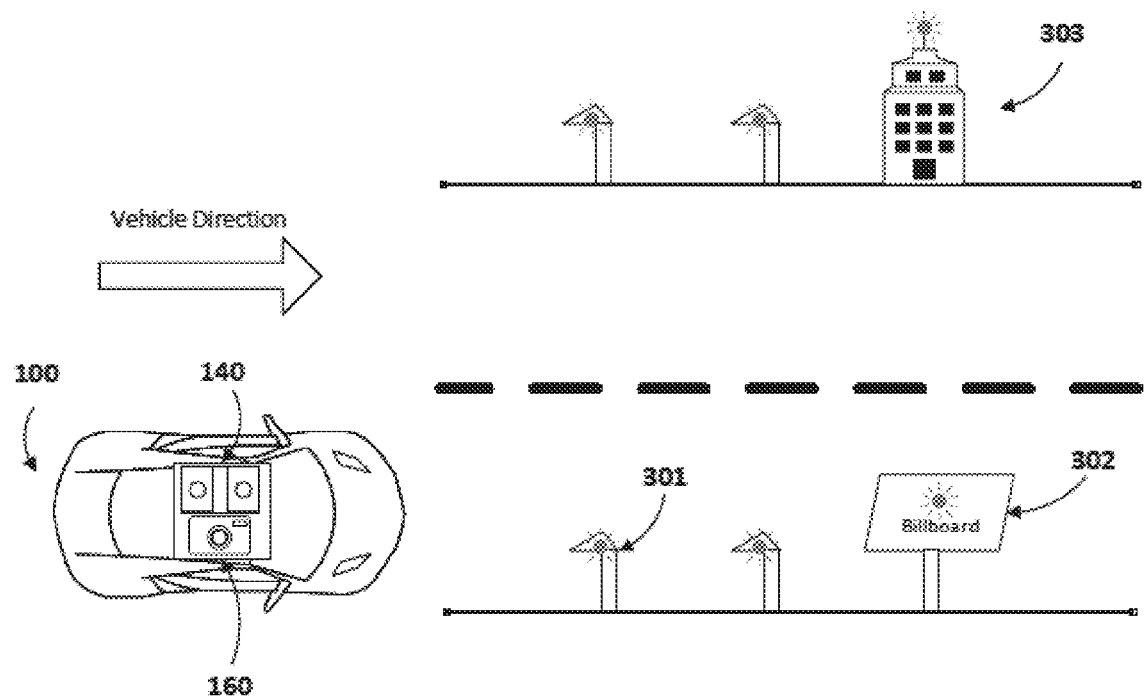
FIG. 3 illustrates a schematic diagram showing an example when a vehicle is traveling on a road with various types of local light sources, according to embodiments of the disclosure.

FIG. 3 illustrates a schematic diagram showing an example when vehicle 100 is traveling on a road with various types of local light sources. Examples of local light sources include streetlamps 301, billboards 302, and lights from roadside buildings 303. As discussed previously, vehicle 100 is equipped with sensors 140 and 160 to capture data used for generating a color point cloud and images of the scene. In addition to that, the captured data may also be selectively provided to local light source identification unit 210 via communication interface 202, as shown in FIG. 2. In some other embodiments, communication interface 202 may not be required and the captured data may be directly provided to unit 210. Local light source identification unit 210 may execute one or more computer programs to enable the system to automatically recognize various objects in the imaging data captured by sensors in the form of color point cloud. The types of objects include, but not limited to, buildings, trees, bushes, traffic lights and signs, road markings, and local light sources. These objects may be pre-specified objects or object classes stored in memory/storage 206, or other storage devices within the system. The objects or object classes can also be learned upon repetitive training. Existing object recognition technologies, such as edge matching, gradient matching, interpretation trees, etc., can be applied to the present disclosure. Alternatively, an operator of vehicle 100 or an offline analyst may manually select local light sources in the images captured by vehicle 100.

Point cloud modification unit 212 is configured to modify point cloud 201 using simulated light from the identified local light sources. Consistent with the present disclosure, point cloud modification unit 212 simulates a poor lighting condition with limited illumination on the environment, such as during nighttime. Unlike daylight that illuminates the entire environment with brightness sufficient for sensors to discern various features along the trajectory vehicle 100 is traveling. However, during night, the environment is generally dark with limited light sources illuminating only a portion of it. In some embodiments, point cloud modification unit 212 simulates projected light from the identified light source and calculates shadow and semi-shadow areas in the scene. A more detailed example will be explained below with reference to FIGS. 4A and 4B.

Figure 4A:
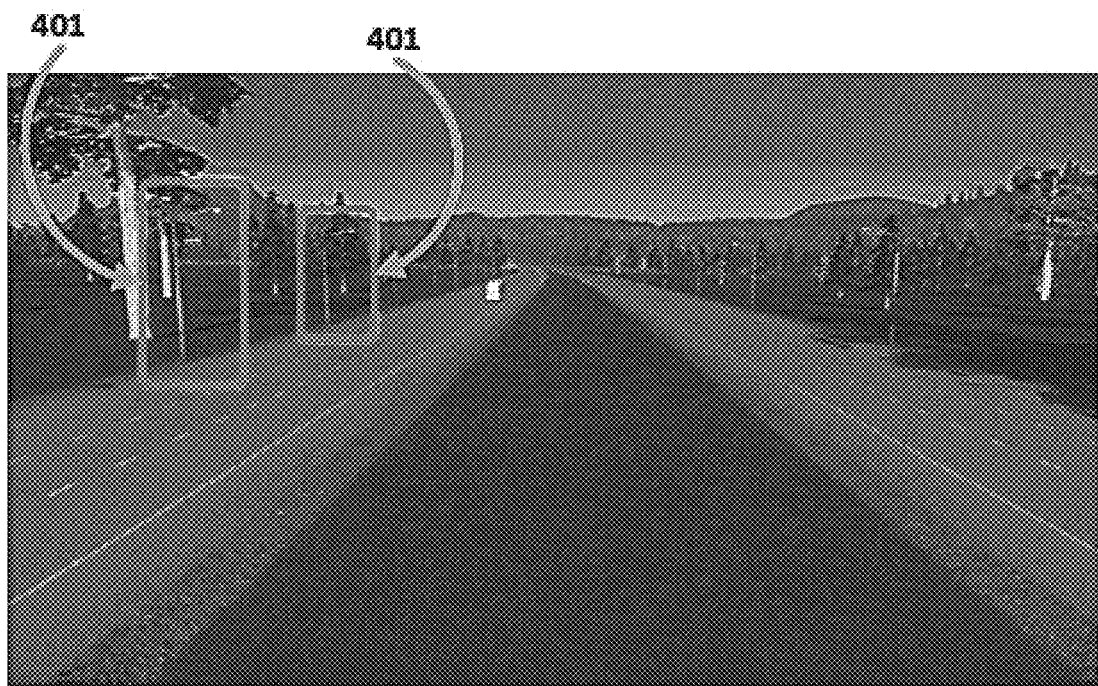
FIG. 4A shows an exemplary 3-D reconstruction of a scene captured during the day, according to embodiments of the disclosure.

FIG. 4A shows an exemplary 3-D reconstruction of the scene captured during the day. Only one type of local light sources, streetlamp 401, is reconstructed in the scene and shown in FIG. 4A for illustration purpose, but it can be interchangeably replaced with other types of local light sources. The reconstructed scene is obtained from the voxel image of point cloud 201, a process that may be carried out by processor 204 or other suitable components within the system. Subsequently, a poor lighting scene is simulated in point cloud modification unit with illustration by FIG. 4B. For example, point cloud modification unit 212 may use the identified local light sources' positions as camera positions, and light directions as camera orientations, and light collimation as camera field-of-view. Based on such a camera setup, point cloud modification unit 212 may render a linear depth map. For example, linear depth map may be a RG double channel image, with the depth information (d) stored in its R channel, and depth square (d*d) stored in its G channel. In some embodiments, the linear depth map may be in a Float32 data format.

Figure 4B:
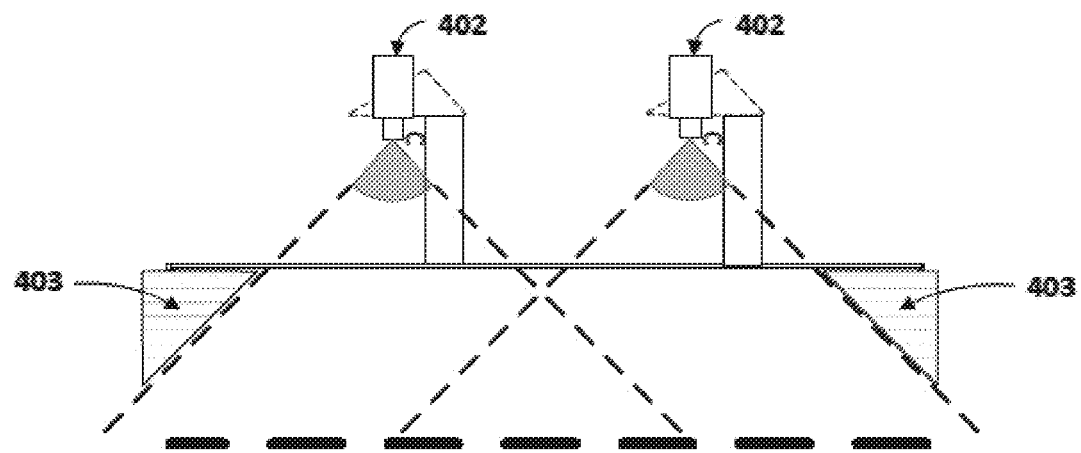
FIG. 4B shows a simulation of a scene under a poor lighting condition, according to embodiments of the disclosure.

Returning to FIG. 2, in some embodiments, point cloud modification unit 212 further calculates shadow areas and semi-shadow areas based on the linear depth map in order to obtain a dark scene of the vehicle trajectory closely approximating the light conditions in reality and for enhancing the positioning of the autonomous driving system at night, with illustrative areas 503 depicted in FIG. 4B. For example, shadow areas may be calculated using only ambient light component while semi-shadow areas may be calculated using both ambient light component and diffuse reflection light component. The depth map may be first convoluted with a normal Gaussian blur kernel. For example, in a 1024*1024 resolution depth map, a 10-pixel kernel may be used. Of course, other kernel sizes may be used to obtain a different convolution matrix that can be used to smooth the rendered images. In some embodiments, point cloud modification unit 212 may then use proper methods, such as a hybrid method combining Variance Shadow Map (VSM) and Exponential Shadow Map (ESM) algorithms, to calculate shadow areas and semi-shadow areas in the scene.

In some embodiments, point cloud modification unit 212 may perform a light shading to the voxel image to obtain modified point cloud data. In some embodiments, deferred light projection rendering and Lambert light projection model may be used for the shading. Deferred light projection rendering has the advantage of sequentially shading the pixels that are actually affected by each local light. This allows the rendering of a plurality of local lights in the simulated scene without compromising the performance significantly. The Lambert light projection model is often used to calculate illuminance from surfaces with isotropic diffuse reflection and excels in its simplicity and ability to approximate shadow areas with diffuse reflection light components, such as the case here. In some embodiments, point cloud modification unit 212 may calculate just the ambient light component for shadow areas, but ambient light component and scattering light component for semi-shadow areas. The shaded voxel image may then be converted back to point cloud data. The shaded point cloud data is therefore an estimate of point cloud data under the poor lighting condition. The modified point cloud data may be stored in memory/storage 206, or other storage devices within the system.

Returning to FIG. 2, image estimation unit 214 is configured to generate an estimated image using the point cloud data modified by point cloud modification unit 212. image estimation unit 214 may first estimate the current pose information of vehicle 100 based on the last position of vehicle 100, which may be received via communication interface 202 from sensor 150. Based on the estimated pose information, a relevant portion of modified point cloud data may be identified, and the simulated image is generated from that portion of modified point cloud data. In this particular embodiment, the generated image simulates an image approximating the scene at night with a poorer lighting condition than the same scene reconstructed from data captured during daytime. The image may be subsequently used to optimize the positioning of vehicle 100 traveling at night.

Figure 5:
FIG. 5 shows one example of a simulated scene during night corresponding to the reconstructed scene in FIG. 4A, according to embodiments of the disclosure.

FIG. 5 shows one example of a simulated scene during night corresponding to the reconstructed scene in FIG. 4A. The primary difference between FIG. 4A and FIG. 5 is the introduction of local light sources (e.g. streetlamp 401) and the removal of natural lights. Although FIG. 5 is a simulation of scene at night, the present disclosure does not restrict the application to night scenes alone, other scenes with poor lighting conditions (e.g., when traveling in a tunnel or under a stormy and sunless weather) can be similarly simulated without departing from the scope of this disclosure.

One embodiment of the simulation of the 3-D night scene will be discussed in detail below. To better imitate the illumination during the night on the same road that vehicle 100 has traveled, it is preferable to have a simulated scene where all detected local light sources along the traveling trajectory in FIG. 4A are deemed to operate in a way as they would in the real world, thereby creating a highly genuine environment under poor lighting conditions that will be used in later processing and position calculation. To achieve that, identifying the location, height, and type of the plurality of local light sources becomes an important task, since these are parameters that will heavily affect the outcome of the simulated scene.

The location and height can be calculated from the depth information gathered from the imaging sensors or detectors capable of perceiving a 3-D image of its surroundings, such as a binocular camera or a LiDAR scanner. Depth of an image pixel is defined as the distance between the image pixel and the camera. The system according to the current disclosure has the ability to extract depth information of the local light sources and then map and transform the extracted depth information to obtain 3-D coordinates of the pixels representing such local light sources in the camera coordinate system. Further approximation to the real world can be realized by using object detection technology. By comparing the detected object with the pre-specified or learned object stored in its database, the system automatically determines the type of each local light source (e.g., streetlamp 301 in FIG. 4A) and its various parameters. Once the type of a local light source is determined, its illumination, intensity, collimation, beam angle (that is, the degree of the width of the light that is emitted from the light source), light direction, color, and other parameters can be obtained through product specifications, materials/components used therein, and other knowledge of the light source. For example, the beam angle of a typical SMD LEDs used in billboards is 120°. Upon knowing these parameters and the location of each local light source, simulation to the dark scene can be optimized.

It should be noted that the reconstruction of the daylight scene and the simulation of the night scene as described in conjunction with FIGS. 2 through 5 can be processed either online (with network communication to devices outside of vehicle 100, such as server 190) or offline (within vehicle 100), or can be a combination of online and offline processing with respect to either the reconstruction alone or the simulation alone, or both.

Vehicle positioning unit 216 in FIG. 2 is configured to better position vehicle 100 traveling under poor lighting conditions in accordance with the modified point cloud data. For example, the estimated image generated from the modified point cloud data by image estimation unit 214 may be compared with the image actually captured by sensor 160 in vehicle positioning unit 216. This allows a vehicle to accurately know its position under poor lighting conditions and thereby improves its travel safety.

The system according to the present disclosure may determine the spatial positioning of a vehicle at any time stamp. The system may include a synchronization system to synchronize sensors 140, 150 and 160 such that point clouds captured by sensor 140, pose information captured by sensor 150, and image frames captured by sensor 160 are all captured at the same time stamps. In some embodiments, the synchronized image frame, point cloud, and associated pose information may be used collectively to position vehicle 100. In some other embodiments, one of the image frame and the point cloud may be used in combination with associated pose information to position vehicle 100. Consistent with the present disclosure, a Pulse Per Second (PPS) signal provided by the GPS/IMU sensor may be used to synchronize the acquisition of information by sensors 140, 150 and 160.

Once the pose information of vehicle 100 at a certain time stamp is estimated and the pose information of sensors 140 and 160 relative to vehicle 100 to which they are mounted is predetermined, the pose information of sensors 140 and 160 can also be estimated from those two pieces of information in a single, unified three-dimensional coordinate system, which can be preferably set as a global coordinate system. As discussed above, sensor 140 may be a LiDAR for acquiring point clouds and sensor 160 may be a camera for capturing images. The following description uses a camera as an example, but the same processing is also applicable to any other imaging devices or scanners used in compatible with the system disclosed herein.

The system according to the present disclosure further receives a last position of vehicle 100 via communication interface 202, and estimates the current pose information of vehicle 100 based on the last position. In some embodiments, the system processes the pose information of the onboard camera with assistance of simulated dark scenes to approximate the accurate position of vehicle 100 under poor lighting conditions, when data captured along the same trajectory vehicle 100 is traveling has been previously transformed into digitized point clouds.

Consistent with the present disclosure, before the system fetches any previously stored point clouds for subsequent processing, vehicle 100 needs to recognize which trajectory it travels along, and determines whether the trajectory matches any data set (preferably as point clouds) stored in the storage device. There are various ways to achieve this. For example, the human operator of vehicle 100 may have personal knowledge of the location of the roads the vehicle travels, and thus instructs the system to fetch the point clouds associated with the roads from the storage device. Alternatively, the system may possess artificial intelligence (AI) capability to automatically recognize the roads with imagery, geographical, locational, spatial, and/or other types of information gathered by the components equipped therewith. Then, the system will compare the information of the roads with the data set from the storage device, and for any matched result, the system automatically fetches the point clouds associated with the roads from the storage device. The point clouds contain shadow area information that may be used to simulate the same scenes under poor lighting conditions.

The system according to the present disclosure further transforms the fetched point clouds in Cartesian space (object) into a truncated set of point clouds in a projective space (clipped camera view) that may be subsequently used to approximate an optimal pose information of the onboard camera.

In some embodiments, the position of a given point in the 3-D coordinate system of the point clouds can be represented by $P_p\{x, y, z, 1\}$. The first three parameters—x, y, and z—represents the location of the point with respect to the orthogonal x-axis, y-axis, and z-axis in the point cloud model coordinate system (which is a Cartesian coordinate system). The last parameter is constantly set as 1 (one) for a Cartesian coordinate system, such as an object coordinate system, but will become a variable when the coordinate system is transformed into a homogenous coordinate system (e.g., a camera view coordinate system).

To convert coordinates of any given point in the object coordinate system associated with the point clouds to those of the same point in the global coordinate system, a model transformation matrix $M_0$ may be applied. This transformation is necessitated by subsequent transformation from a Cartesian coordinate system to a camera-view-based projection coordinate system, which also employs the global coordinates for positioning.

Figure 6A:
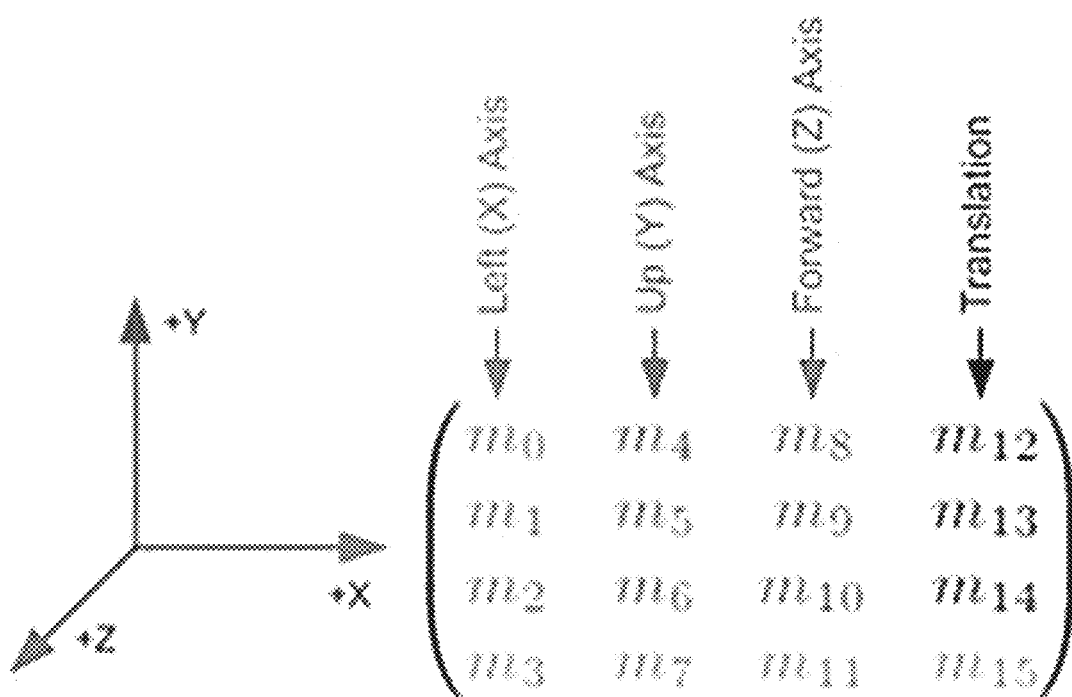
FIG. 6A illustrates an exemplary transformation matrix of a camera view coordinate system, according to embodiments of the disclosure.

Consistent with the above embodiments, assuming the forward direction $V_f$ of the camera represent the z-axis of the camera view coordinate system (projective space), the up direction $V_u$ represent y-axis, and the left direction $V_l$ represent x-axis, an exemplary transformation matrix of the camera view coordinate system $M_1$ is illustrated in FIG. 6A. The three element sets on the left three columns of the matrix—$(m_0, m_1, m_2)$, $(m_4, m_5, m_6)$ and $(m_8, m_9, m_{10})$—for Cartesian and affine transformation, such as rotation or scaling. The rightmost element set—$(m_{12}, m_{13}, m_{14})$—are for translation transformation. The additional variables—m3, m7, m11, and m15—are respectively set as 0, 0, 0, and 1 in this camera view coordinate system. Matrix $M_1$ is used to convert the coordinates of any given point in the global coordinate system into coordinates of the same point in a camera view coordinate system.

Figure 6B:
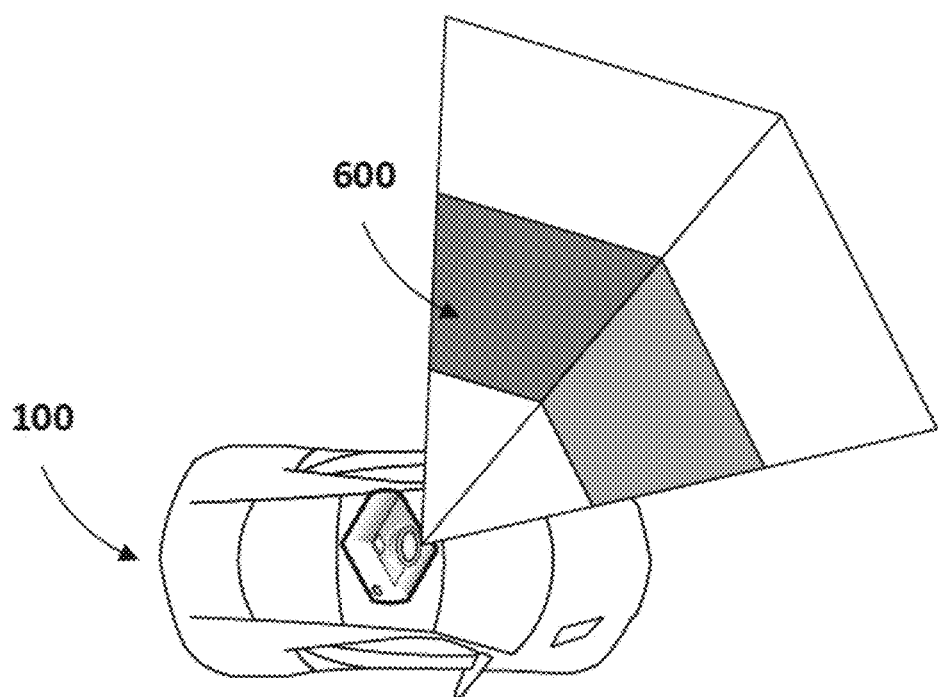
FIG. 6B shows an exemplary viewing frustum with respect to a camera mounted on a vehicle, according to embodiments of the disclosure.

Consistent with the present disclosure and to further approximate the actual images captured by a camera onboard the vehicle, a transformation technique known as "frustum culling" or "clipping" may be applied to the camera view coordinates so that a 3-D camera image may be projected to a 2-D surface. Frustum culling uses a function that clips all vertex data from the camera view coordinates (which resembles a pyramid in a three-dimensional coordinate system), so that points falling outside of the post-clipping coordinates (also called "viewing frustum") will not be projected and thus not visible from the 2-D image. FIG. 6B shows an exemplary viewing frustum (dark area of the pyramid) 600 with respect to the camera mounted on vehicle 100. The projection matrix $M_2$ of the truncated pyramid is built upon six parameters—left, right, top, bottom, near and far boundary values, which in turn are defined by the camera's parameters, such as its field of view (FOV) angle, the aspect ratio of its image, etc. For the variable in the post-clipping camera view coordinates, it may be set as a number other than 1 to reflect the fact that the point is now in a homogenous coordinate system.

After the above step-by-step transformations, the coordinates of the same point in the viewing frustum Pc{x', y', z', w'} can be calculated from the function below:

$$P_c = P_P \cdot M_0 \cdot M_1 \cdot M_2 \qquad \text{Eq. 3}$$

If the absolute values on all three axes (x-axis, y-axis, and z-axis) in $P_c$ are less than 1, that point is kept in the point cloud within the viewing frustum; otherwise, the point is discarded. The resulted point clouds constitute a subset of the fetched point clouds that are projected to a 2-D image, therefore simulating an image captured by the onboard camera with the estimated pose information under poor lighting conditions.

Figure 7A:
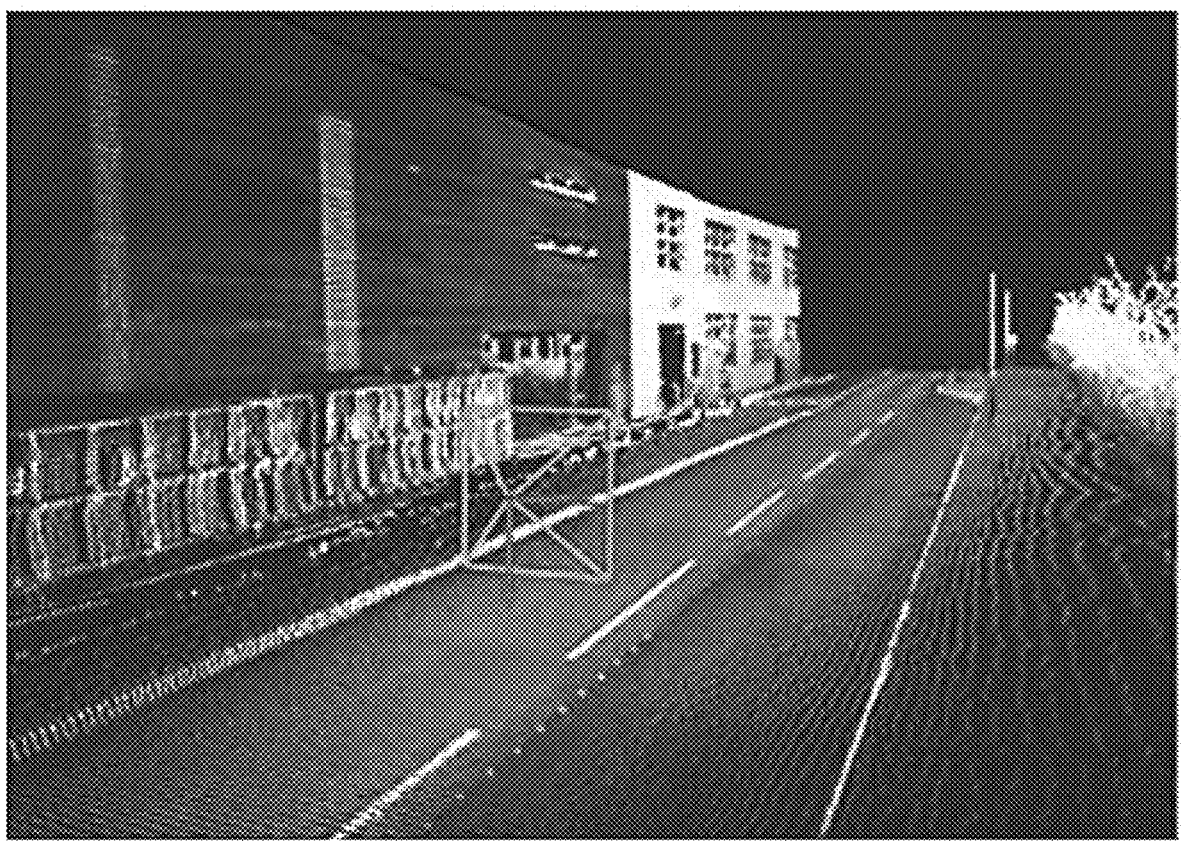
FIG. 7A illustrates an exemplary pre-truncated camera view coordinate system under a poor lighting condition, according to embodiments of the disclosure.
Figure 7B:
FIG. 7B illustrates an actual image captured by an onboard camera under the same poor lighting condition of FIG. 7B, according to embodiments of the disclosure.

FIG. 7A illustrates an exemplary pre-truncated camera view coordinate system in a simulated dark scene. The apex of the pyramid (the point where most lines intersect) is the estimated position of the camera at a given time stamp. After transformation involving frustum culling, a simulated 2-D image may be obtained as if it were taken by the camera at that apex. Each image represents a view from the estimated position of the camera as if that camera were capturing images from that position. One or more of such simulated images are to be compared with one or more of actual images captured by the onboard camera under the dark lighting condition, as illustrated in FIG. 7B. When the pose information of the onboard camera is optimized as a result of minimizing the similarity between a simulated image and an actual image, vehicle 100 traveling under poor lighting conditions can be accurately positioned based on the pose information of the camera in the global space and the predetermined pose information of the camera relative to vehicle 100.

Consistent with the present disclosure, an exemplary technique used for minimizing similarity between a simulated image (object x) and an actual image (object y) calculates the normalized compressed distance (NCD) between the two. Since both images may be produced as output by the same predetermined programming language, such language may include the shortest program that computes x from y. The length of such shortest program, expressed as Kolmogorov complexity, is defined as the information distance between the two images. After applying real-world compressors, the NCD between objects x and y can be expressed by the following equation:

$$NCD_Z(x, y) = \frac{Z(xy) - \min\{Z(x), Z(y)\}}{\max\{Z(x), Z(y)\}} \qquad \text{Eq. 4}$$

Z(x) is the length of the object x with compressor Z. The outcome of the NCD among different simulated images may be compared to identify the simulated image with the closest similarity with the actual image captured by the onboard camera. In some more embodiments, a joint distribution $p \mathcal{I}_c \mathcal{S}$ may be constructed for each camera, and the total distance (i.e., a sum of distances across all the camera) may be used as a cost function for the optimization. For example, Eq. 5 may be such a cost function:

$$\operatorname*{argmin}_{G_{R,W}} \sum_c^{\text{Cameras}} f_{distance}(\mathcal{I}_c(\overline{S}_c), \mathcal{I}_S(\overline{S}_c)) = \operatorname*{argmin}_{G_{R,W}} \sum_c^{\text{Cameras}} f_{distance}(\mathcal{I}_c(x), \mathcal{I}_S(q) \mid \forall q \in \overline{S}_c) \qquad \text{Eq. 5}$$

where $\mathcal{I}_C$ is the actual image captured by the camera, and $\mathcal{I}_S$ is the simulated image, and $G_{R,W}$ is the pose information.

Figure 8:
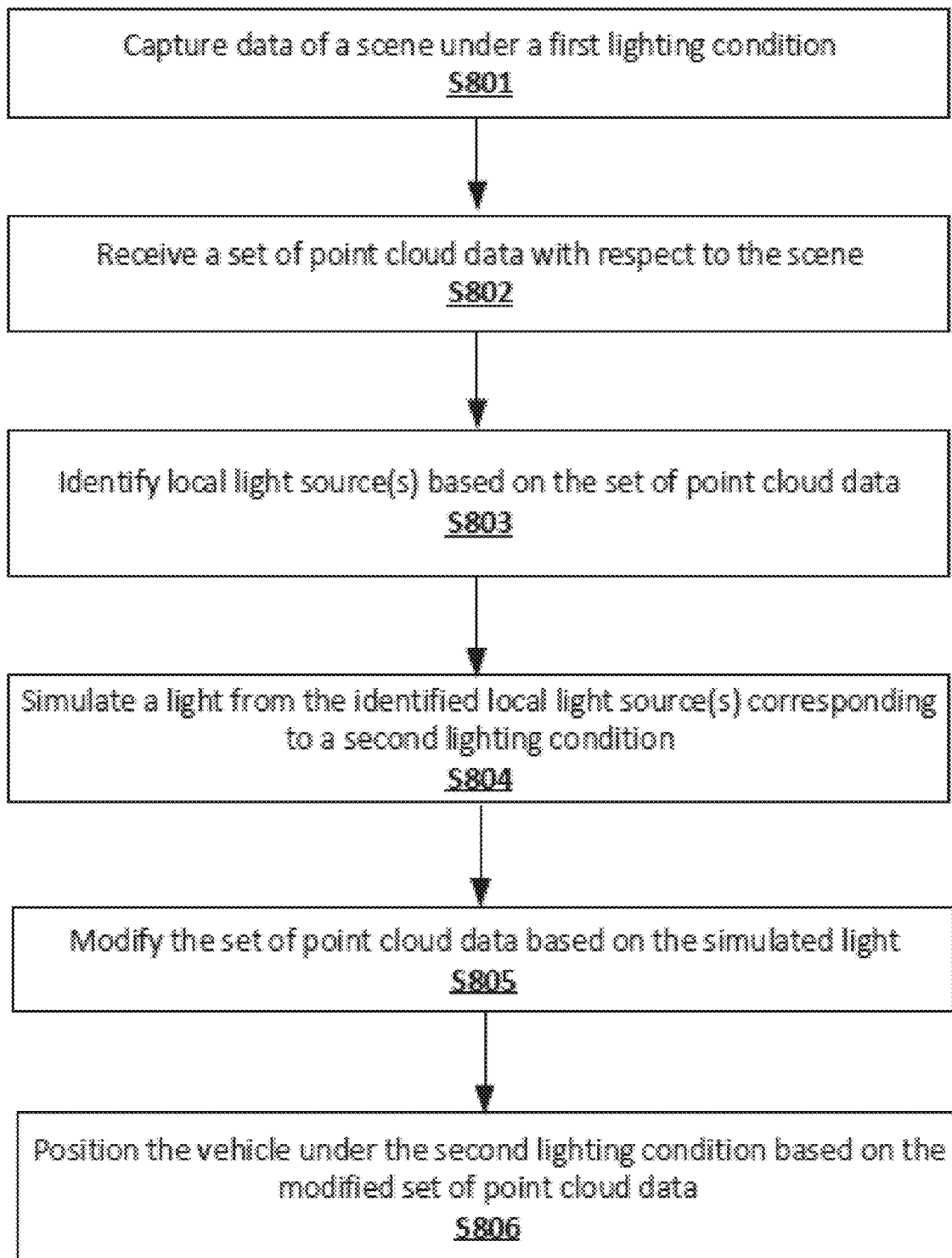
FIG. 8 illustrates a flowchart of an exemplary method for positioning a vehicle under a poor lighting condition, according to embodiments of the disclosure.

FIG. 8 illustrates a flowchart of an exemplary method 800 for positioning a vehicle under poor lighting conditions. In some embodiments, method 800 may be implemented by a system 200 that includes, among other things, a local light source identification unit 210, a point cloud modification unit 212, and a vehicle positioning unit 216. For example, step S803 of method 800 may be performed by local light source identification unit 210, steps S804 and S805 may be performed by point cloud modification unit 212, and step S806 may be performed by vehicle positioning unit 216. It is to be appreciated that some of the steps may be optional to perform the disclosure provided herein, and that some steps may be inserted in the flowchart of method 800 that are consistent with other embodiments according to the current disclosure. Further, some of the steps may be performed simultaneously, or in an order different from that shown in FIG. 8.

In step S801, various types of data may be captured by onboard sensors of an autonomous driving vehicle. For example, point cloud data 201 may be acquired by a sensor 140, such as a LiDAR scanner; trajectory information 203 may be obtained by a sensor 150, such as a GPS receiver, an IMU sensor, or both; and digital images 205 may be captured by a sensor 160, such as an imaging sensor as used in a camera.

In step S802, a set of point cloud data acquired by sensor 140 may be received by a communication interface 202 for storage and subsequent processing. The set of point cloud data is associated with a scene of the trajectory that the autonomous driving vehicle is traveling. According to the method 800 of the disclosure, the scene can be reconstructed and rendered using captured point cloud data.

In step S803, local light sources in the scene may be identified based on the set of point cloud data. In some embodiments, the local light sources may be identified manually by an operator. In other embodiments, the local light sources may be extracted from the point cloud data automatically using object recognition technology or the like. These local light sources may be used to simulate a scene with poor lighting conditions, such as a night scene.

In step S804, in order to obtain the simulated scene with poor lighting conditions, method 800 may further include simulating a light as if it were emitted from the identified local light source. The simulation may take into account the various parameters of the identified local light source, such as its illumination, intensity, collimation, beam angle, light direction, color, etc.

In step S805, the simulated light may be applied to the set of point cloud data 201 acquired by sensor 140, so that the set of point cloud data 201 may be modified and a simulated dark scene may be generated. In some embodiments, the modification may further includes determining a depth map by projecting the simulated light from the identified local light source on the set of point cloud data, and determining at least one shadow area and at least one semi-shadow area based on the depth map. Shadow areas may be calculated using only ambient light component while semi-shadow areas may be calculated using both ambient light component and diffuse reflection light component. By applying illuminations calculated from the at least one shadow area and at least one semi-shadow area, the set of point cloud data may be shaded so that a dark scene can be generated. The generated dark scene approximates the actual environment of the same trajectory that vehicle 100 would travel during night time.

In step S806, vehicle 100 may be positioned more accurately under poor lighting conditions based on the modified set of point cloud data. In some other embodiments, the position of vehicle 100 may further account for pose information. The current pose information of vehicle 100 may be estimated based on the last position of vehicle 100, which may be received via communication interface 202 from sensor 150. Based on the estimated current pose information, a relevant portion of modified point cloud data may be identified. In some embodiments, an image estimation unit 214 may be configured to generate an estimated image based on that portion of modified point cloud data. The estimated image may be compared with an actual image of the same scene under poor lighting conditions in which vehicle 100 is traveling. The actual image may be captured by an imaging sensor, such as that found in a camera. The comparison may further includes calculating the information distance between the estimated image and the captured image, so that the comparison result may indicate the simulated image with the closest similarity with the actual image, thereby assisting the accurate positioning of vehicle 100.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc, a flash drive, or a solid-state drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for positioning a vehicle, comprising:
   a communication interface configured to receive a set of point cloud data with respect to a scene captured under a first lighting condition by at least one sensor;
   a storage configured to store the set of point cloud data; and
   a processor configured to:
      identify at least one local light source based on the set of point cloud data captured under the first lighting condition;
      determine a simulated light associated with the at least one local light source, wherein the simulated light is a light as it were emitted from the at least one local light source under a second lighting condition;
      modify the set of point cloud data based at least in part on the simulated light, the modified set of point cloud data corresponding to the second lighting condition; and
      position the vehicle under the second lighting condition based on the modified set of point cloud data.

2. The system of claim 1, wherein the communication interface is configured to receive an image with respect to the scene captured by an imaging sensor under the second lighting condition, and wherein the processor is further configured to:
   generate an estimated image based on the modified set of point cloud data; and
   position the vehicle under the second lighting condition by comparing the estimated image with the captured image.

3. The system of claim 2, wherein the communication interface is further configured to receive a last position of the vehicle, and wherein the processor is further configured to estimate current pose information of the vehicle based on the last position of the vehicle.

4. The system of claim 3, wherein the processor is further configured to locate point cloud data corresponding to the current pose information of the vehicle among the modified set of point cloud data.

5. The system of claim 2, wherein to generate the estimated image, the processor is further configured to simulate illumination of the identified local light source as it would have illuminated under the second lighting condition.

6. The system of claim 2, wherein comparing the estimated image and the captured image includes calculating an information distance between the estimated image and the captured image.

7. The system of claim 1, wherein the second lighting condition includes less illumination than the first lighting condition.

8. The system of claim 1, wherein to modify the set of point cloud data, the processor is further configured to:
   determine a depth map by projecting the simulated light from the identified local light source on the set of point cloud data; and
   determine at least one shadow area and at least one semi-shadow area based on the depth map.

9. The system of claim 8, wherein to modify the set of point cloud data, the processor is further configured to shade the set of point cloud data using illuminations calculated based on the at least one shadow area and the at least one semi-shadow area.

10. A method for positioning a vehicle, comprising:
    receiving a set of point cloud data with respect to a scene captured under a first lighting condition by at least one sensor;
    identifying at least one local light source based on the set of point cloud data captured under the first lighting condition;
    determining a simulated light associated with the at least one local light source, wherein the simulated light is a light as it were emitted from the at least one local light source under a second lighting condition;

modifying the set of point cloud data based at least in part on the simulated light, the modified set of point cloud data corresponding to the second lighting condition; and positioning the vehicle under the second lighting condition based on the modified set of point cloud data.

11. The method of claim 10, further comprising:

receiving an image with respect to the scene captured by an imaging sensor under the second lighting condition;

generating an estimated image based on the modified set of point cloud data; and positioning the vehicle under the second lighting condition by comparing the estimated image with the captured image.

12. The method of claim 11, further comprising:

receiving a last position of the vehicle; and estimating current pose information of the vehicle based on the last position of the vehicle.

13. The method of claim 11, wherein comparing the estimated image with the captured image includes calculating an information distance between the estimated image and the captured image.

14. The method of claim 10, wherein modifying the set of point cloud data further includes:

determining a depth map by projecting the simulated light from the identified local light source on the set of point cloud data; and determining at least one shadow area and at least one semi-shadow area based on the depth map.

15. The method of claim 14, wherein modifying the set of point cloud data further includes shading the set of point cloud data using illuminations calculated based on the at least one shadow area and the at least one semi-shadow area.

16. A non-transitory computer-readable medium having instructions stored thereon that, when executed by one or more processors, causes the one or more processors to perform a method for positioning a vehicle, the method comprising:

receiving a set of point cloud data with respect to a scene captured under a first lighting condition by at least one sensor;

identifying at least one local light source based on the set of point cloud data captured under the first lighting condition;

determining a simulated light associated with the at least one local light source, wherein the simulated light is a light as it were emitted from the at least one local light source under a second lighting condition;

modifying the set of point cloud data based at least in part on the simulated light, the modified set of point cloud data corresponding to the second lighting condition; and positioning the vehicle under the second lighting condition based on the modified set of point cloud data.

17. The non-transitory computer-readable medium of claim 16, wherein the method further comprises:

receiving an image with respect to the scene captured by a camera under the second lighting condition;

generating an estimated image based on the modified set of point cloud data; and positioning the vehicle under the second lighting condition by comparing the estimated image with the captured image.

18. The non-transitory computer-readable medium of claim 17, wherein the method further comprises:

receiving a last position of the vehicle; and estimating current pose information of the vehicle based on the last position of the vehicle.

19. The non-transitory computer-readable medium of claim 17, wherein comparing the estimated image with the captured image includes calculating an information distance between the estimated image and the captured image.

20. The non-transitory computer-readable medium of claim 16, wherein modifying the set of point cloud data further includes:

determining a depth map by project the simulated light from the identified local light source on the set of point cloud data; and determining at least one shadow area and at least one semi-shadow area based on the depth map.

* * * * *